United States Patent [19]
Reigel et al.

[11] 3,920,774
[45] Nov. 18, 1975

[54] EVAPORATIVE COOLER

[75] Inventors: Stanley A. Reigel, Overland Park, Kans.; Charles D. Doyle, Kansas City, Mo.

[73] Assignee: Standard Havens, Inc., Kansas City, Mo.

[22] Filed: Jan. 10, 1974

[21] Appl. No.: 432,319

Related U.S. Application Data

[62] Division of Ser. No. 304,076, Nov. 6, 1972, Pat. No. 3,842,615.

[52] U.S. Cl................. 261/17; 261/39 R; 261/118
[51] Int. Cl.²........................................ C10K 1/06
[58] Field of Search ............ 261/17, 115, 116, 117, 261/118, 39 R; 55/257

[56] References Cited
UNITED STATES PATENTS

| | | | |
|---|---|---|---|
| 884,077 | 4/1908 | Cramer | 261/115 |
| 1,255,518 | 2/1918 | Ehrhart | 261/115 |
| 2,865,619 | 12/1958 | Haltmeier | 261/116 |
| 3,121,127 | 2/1964 | Hedin | 261/116 X |
| 3,532,595 | 10/1970 | Arnesjo et al. | 261/115 X |
| 3,592,631 | 7/1971 | Cattelain | 261/115 X |
| 3,668,835 | 6/1972 | Vicard | 261/116 X |

*Primary Examiner*—Frank W. Lutter
*Assistant Examiner*—William Cuchlinski, Jr.
*Attorney, Agent, or Firm*—Lowe, Kokjer, Kircher, Wharton & Bowman

[57] ABSTRACT

A cooling tower for reducing process gas temperature by vaporization of liquid water while maintaining a dry bottom operation. The gas discharge duct is located in the lower hopper of the tower and a preferred orientation of spray nozzles insures minimum condensation of the atomized water spray. The water supply is regulated by a cascade control system employing both proportional and derivative modes of control during steady state operation and only proportional control during start-up operation.

3 Claims, 4 Drawing Figures

EVAPORATIVE COOLER

This is a division of application Ser. No. 304,076, filed Nov. 6, 1972, now U.S. Pat. No. 3,842,615, issued Oct. 25, 1974.

BACKGROUND AND SUMMARY OF THE INVENTION

In the field of air pollution control, it is frequently necessary to cool the hot process gases prior to introduction to pollution control devices such as dust collectors, baghouses, and electrostatic precipitators in order to prevent damage to such equipment. Common methods of cooling a gas stream include dilution cooling, heat exchange cooling, and evaporative cooling. In dilution cooling, ambient air is introduced to a hot gas stream in sufficient quantities to achieve a desired mixture temperature. Heat exchange cooling is typically accomplished by natural circulation of ambient air over a conduit containing the hot process gas so that heat from the gas is transferred through the conduit and into the air.

In evaporative cooling, the field to which this invention particularly relates, liquid water is introduced directly into the hot process gas stream. The heat supplied by the hot gas to vaporize the water (i.e., the latent heat of vaporization of water) causes the resulting temperature decrease of the mixture.

Evaporative cooling is physically carried out in a tower vessel in which the hot process gas is introduced at the top of the vessel and subjected to a water spray. Gas discharged from the vessel near the bottom thereof is then delivered to a pollution control device.

Although the relatively low water consumption and total gas volume decrease make evaporative cooling attractive, this particular field has faced many traditional problems. Predominant among these has been that of maintaining a dry (i.e., free of liquid water) outlet gas within the required temperature range when wide fluctuations of inlet gas temperature are experienced. Such as been the case particularly when high pressure water nozzles are employed because they cannot be modulated without adversely affecting the droplet size, which results in incomplete evaporation. In order to achieve a means of temperature control, banks of these high pressure nozzles have been employed. Even with this banking arrangement, however, control is attainable only by completely closing off one or more banks which permits control only by discrete incremental "steps" rather than full range and continuous adjustment needed for precise temperature regulation.

Evaporative cooling systems are often further inhibited by the tendency of their control systems to "over react" in altering the cooling water supply. This also adds to outlet temperature fluctuation due to the time lag between outlet temperature sensing and water spray adjustment near the inlet area of the tower.

An additional vexing problem encountered with evaporative cooling is the removal of dust which builds up in the bottom of the tower, due to inertial separation from the gas, as it changes direction for discharge through the outlet duct. Since the evaporative cooler normally precedes a dust collection system, it is desirable to maintain entrainment of the dust to the collection system so that only one dust discharge point is required.

One of the primary goals of this invention is to provide an evaporative cooler which eliminates the operational difficulties heretofore found in the art, while still retaining the benefits of cooling gases by the evaporation of water.

More particularly, an object of this invention is to provide an evaporative cooler wherein gas discharge therefrom is absolutely free of water condensate. Such operations permit use of air pollution control devices, such as fabric type dust collectors, in which moist gas causes clogging and damage to the collector representing acute maintenance problems.

Another object of the invention is to provide an evaporative cooler regulated by a control system of a highly reliable nature to accurately monitor and control the outlet temperature of the process gas. Control is enhanced by atomizing the cooling water to a high degree while providing full range modulation of the spray in order to supply only the necessary amount of water for the hot gas. This control system effectively provides completely dry gas from the outlet of the cooling tower over a wide range of fluctuating inlet temperatures.

An additional object of the invention is to provide an evaporative cooler of dependable and reliable operational characteristics in which spray nozzles assisted with compressed gas completely atomize the water to effect superior droplet size control, lower water pressure requirements and provide clog-free operation of the spraying equipment.

A further object of the invention is to provide an evaporative cooler equipped with gas atomizing nozzles to provide precise modulation with full range adjustments whereby the banking arrangement of spray heads as heretofore found in the art are eliminated, and the number of spray nozzles may be kept to a minimum. With no nozzles located below others, such as found in banking arrangements, sludge buildup on nozzles and piping is also eliminated.

Yet another object of the invention is to provide an evaporative cooler wherein buildup of dust in the bottom of the tower is virtually eliminated, thus permitting dust to be carried through with the discharged gas to subsequent pollution control equipment.

Other and further objects of the invention, together with the features of novelty appurtenant thereto, will appear in the course of the following description.

DESCRIPTION OF THE DRAWING

In the accompanying drawings, which form a part of the specification and are to be read in conjunction therewith, and in which like reference numerals are employed to indicate like parts in the various views.

Figure 1:
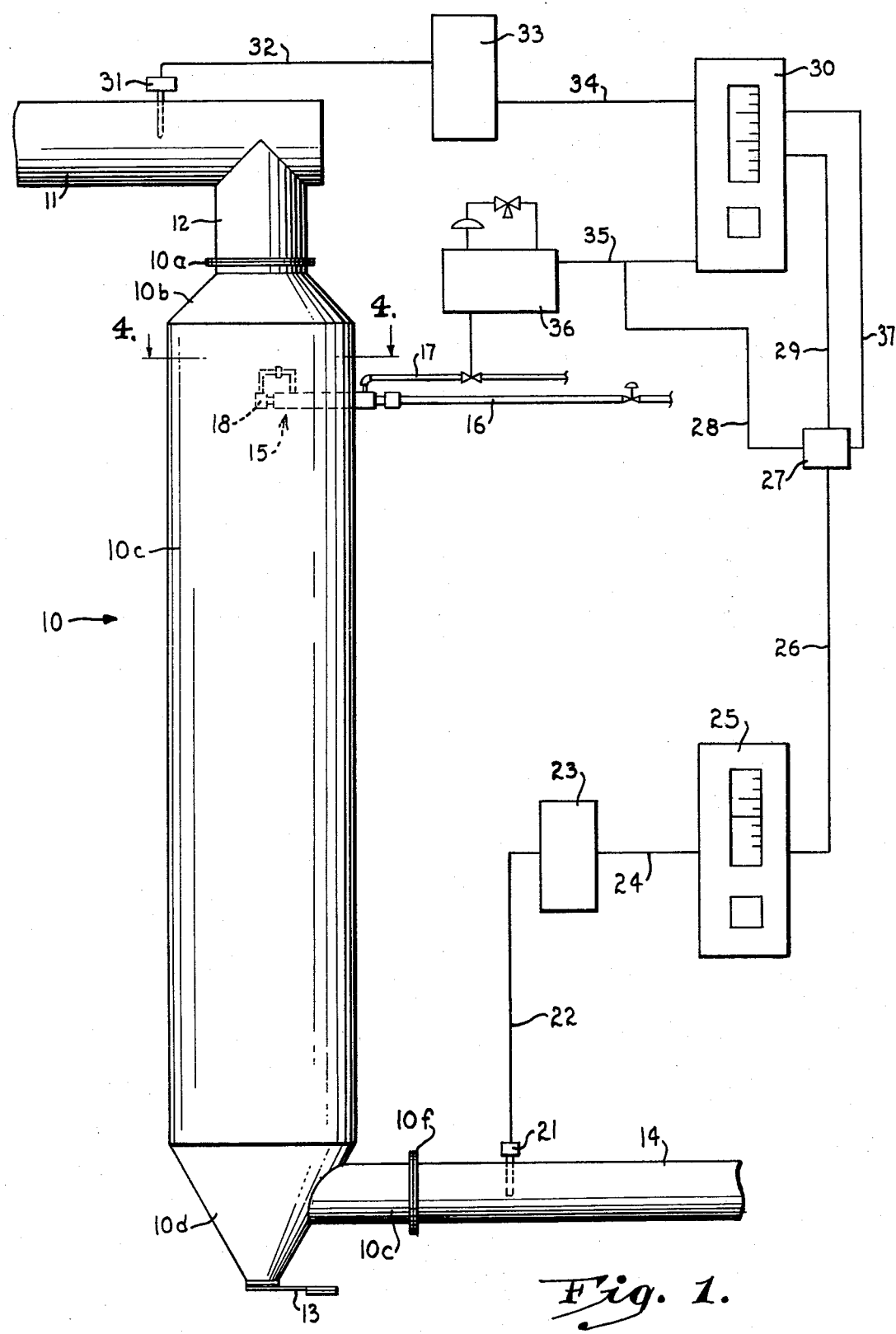
FIG. 1 is a schematic view of an evaporative cooler constructed in accordance with a preferred embodiment of our invention.

Referring to the drawings in more detail, the evaporative cooler includes a cooling tower, generally designated by the numeral 10, to which hot gas is piped by an inlet conduit 11. The conduit 11 may be conventionally connected to process equipment generating hot gases, such as a cupola in a foundry.

The conduit 11 is journaled to an inlet duct 12 which is connected by means of a flange joint 10a to a conical transition section 10b located atop the main body of the tower comprising a cylindrical shell 10c. Journaled to the lower end of the shell 10c is a conical hopper 10d. A counter-weighted dumping door 13 closes the lower end of the hopper 10d. Connected through the sloped wall of the hopper 10d is a horizontally oriented discharge pipe 10e which is flanged at joint 10f to an outlet conduit 14. The outlet conduit 14 may be conventionally connected to subsequent process equipment such as an air pollution control device.

Within the upper region of the tower 10, slightly below the transition piece 10b, is disposed the spraying equipment for introducing liquid water into the gas stream. The spraying equipment comprises one or more spray header assemblies, generally designated by the numeral 15, which are mounted through the shell wall 10c and are now to be described in detail with reference to FIGS. 2 and 3.

Figure 3:
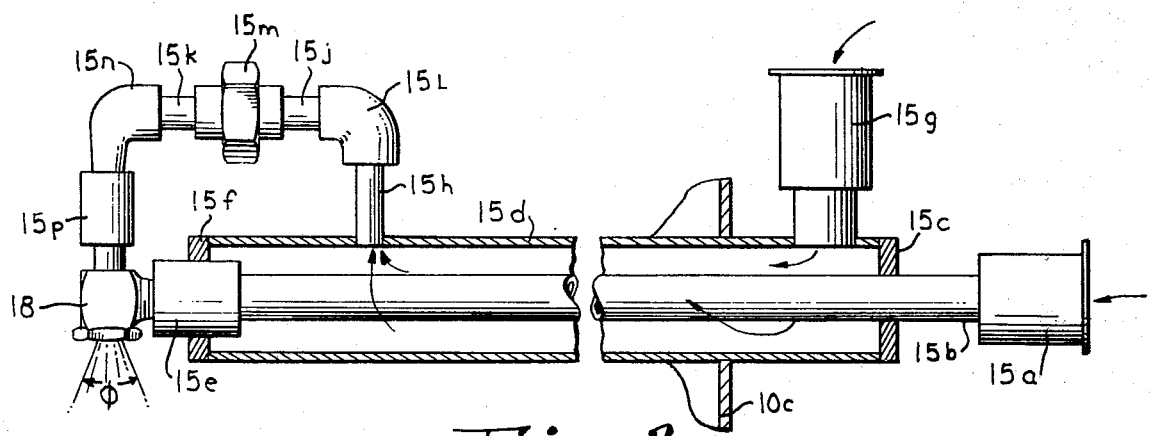
FIG. 3 is a side elevational view of a spray nozzle header assembly, with a portion thereof shown in section to better illustrate the details of construction.

Referring first to FIG. 3, the spray header 15 includes a coupling 15a which is connected to an air line 16 from the compressed air supply of the plant. The coupling 15a is also connected to a pipe 15b that extends through an end seal plate 15c and runs interiorally of a pipe jacket 15d which is of greater inside diameter than the outside diameter of the pipe 15b to provide an annulus therebetween. The pipe 15b is coupled to a spray nozzle 18 by a pipe connection 15e which extends through the seal plate 15f at the opposite end of the jacket 15d. Toward the outer end of the jacket 15d, a pipe fitting 15g provides the connection to a regulated water line 17. Toward the inner end of the jacket 15d is an upstanding pipe stub 15h which is connected, by means of an elbow 15l, at the upper end thereof to a horizontal pipe extension 15j. The extension 15j is connected to a second extension 15k by a pipe union 15m. Through a downwardly turned elbow 15n, the foregoing piping is connected by a fitting 15p to the top of the spray nozzle 18.

Figure 2:
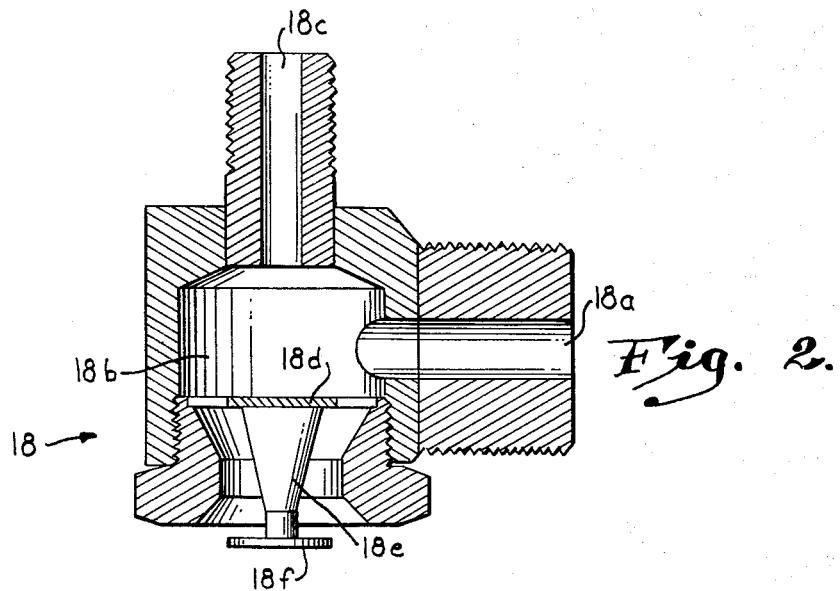
FIG. 2 is an enlarged sectional view of a spray nozzle employed to atomize the liquid water.

As shown in section in FIG. 2, the nozzle 18 includes the air inlet portion 18a which is threadably received by the pipe coupling 15e of the air supply. The air inlet 18a leads to a mixing chamber 18b interiorally of the nozzle body. A water inlet 18c extends through the top of the mixing chamber 18b, at a right angle to the air inlet 18a, and is connected to the water supply at the previously mentioned pipe fitting 15p. At the lower end of the chamber 18b is a fluid impingement plate 18d which water impacts after delivery through the inlet 18c to promote turbulent mixing with the air in chamber 18b. The mixture of air and water is then sheared through the nozzle discharge around a pintle 18e to impact against the pintle plate 18f at the outer end thereof. With proper regulation of the water flow within a selected range of air pressure (typically, 40 to 100 psi), the spray header 15 and nozzle 18 cause atomization of the water into the cooling tower in a downwardly directed, cone-shaped spray pattern characterized by the included angle $\Phi$ in FIG. 3.

In a large installation, where sizeable quantities of hot process gas must be cooled, it will likely be necessary to employ more than one spray header assembly 15 in order to deliver sufficient water to the tower. In this regard, attention is directed to FIG. 4 wherein a plurality of spray headers 15 are shown mounted in a preferred orientation. The pipe fitting 15g of each spray header is connected to a water manifold 19 which, in turn, is connected to the regulated water supply line 17. Likewise, each coupling 15a of the headers is connected to an air manifold 20 which, in turn, is connected to the air supply line 16.

The nozzles 18 are located within the tower at preselected locations in order to eliminate the overlap of spray patterns of adjacent nozzles and to also eliminate impingement of the spray pattern on the interior surface of the shell 10c. In locating the nozzles it is assumed that the discernible cone-shaped spray pattern emanating from the nozzle will be obliterated in two feet of tower height based on a process gas velocity through the tower of 1,200 feet per minute. Accordingly, the maximum distance which the nozzle 18 may be located from the center of the tower, without the spray pattern contacting the tower walls, is given by the following mathematical expression:

$r = R - 2 \tan (\Phi/2)$ where:
$r$ = the distance of the nozzle from the center of the tower, in feet
$R$ = the radius of the tower, in feet
tan = tangent of the angle expression
$\Phi$ = the angle of the cone-shaped spray pattern, in degrees The foregoing equation for the distance r may also be expressed as the radius in feet of the tower minus the quantity two times the tangent of the spray pattern in degrees divided by two.

In order to prevent overlap of spray patterns, successive nozzles 18 must be spaced apart by an included angle about the center of the tower described by the following mathematical expression:

$$\theta = 2 \sin^{-1} \left[ \frac{2 \tan (\Phi/2)}{r} \right]$$

where:
$\theta$ = the angle between successive nozzles measured from the center of the tower, in degrees
$\sin^{-1}$ = the inverse or arcsin of the expression The foregoing general expression for the angle $\theta$ may also be expressed as two times the arcsin of the function comprising the dividend two times the tangent of the nozzle spray pattern in degrees divided by two, such dividend divided by the distance in feet of the nozzle from the center of the tower.

When the nozzles are located the maximum distance from the center of the tower, still without the spray patterns contacting the tower, then the angle $\theta$ function becomes:

$$\theta = 2 \sin^{-1} \left[ \frac{2 \tan(\Phi/2)}{R - 2 \tan(\Phi/2)} \right]$$

The foregoing equation for the angle $\theta$ may also be expressed as two times the arcsin of the function comprising the dividend two times the tangent of the nozzle spray pattern in degrees divided by two, such divident divided by the divisor expressing the radius in feet of the tower minus two times the tangent of the spray pattern in degrees divided by two.

Typically, spray nozzles may be selected which generate a pattern within the range of 45° to almost 180°. By way of example, assuming a plurality of 90° nozzles are to be located in a tower having a radius of 6 feet, the maximum distance which the nozzles may be located away from the center of the tower without the spray pattern contacting the tower walls would equal 4 feet. Assuming that the nozzles are so oriented at a distance of 4 feet from the center of the tower, then the angle θ between successive nozzles would be equal to 60° and, therefore, a total of 6 nozzles may be placed in the tower. If, however, such nozzles were located 3 feet from the center of the tower, then the angle θ would equal approximately 84°, and not more than four nozzles could be arranged in the preferred orientation.

Referring once again to FIG. 1, there is schematically illustrated a "cascade" type control system for regulating the amount of water delivered to the tower. As those skilled in the instrument and control art recognize, the general intent of a process control system is to receive a signal representing the measured value of a process variable, to compare this actual value with the desired value of the variable (i.e., the set point), and to actuate a valve or other control device to cause the difference between the measured and desired values to be reduced toward zero.

With respect to the schematic components shown in FIG. 1, a temperature sensing element 21, such as a thermocouple, is installed in the outlet gas duct 14. Signals from the thermocouple 21, passing through line 22, are transmitted by means of a temperature transmitter 23 through line 24 to the outlet temperature controller 25 which generates signals carried by line 26 to a relay switch 27. Depending upon the temperature of the inlet gas, as will soon be discussed, the signal to the relay 27 received from controller 25 is transmitted through either bypass line 28 or a line 29 connected to the inlet temperature controller 30.

A thermocouple 31 is located in the inlet gas duct 11, from which signals passing through line 32 are transmitted to the controller 30 by means of a temperature transmitter 33 through line 34. A transmission line 35 connects the controller 30 to a flow control valve 36 which regulates the amount of water delivered to the tower. Bypass line 28 is tied into the line 35 between the controller 30 and control valve 36. The alarm contacts of the controller 30 are connected to the relay 27 by an alarm signal line 37.

In operation, and assuming that the inlet gas is above a preselected temperature (for example, above the design outlet temperature of the gas), the outlet thermocouple 21 and temperature controller 25 determine whether or not the actual outlet temperature of the gas discharged through duct 14 is the same as the desired temperature setting or set point of the controller 25. Typically, this set point would fall within the range of 350° to 500° F. If the outlet gas temperature is the same as the set point, a signal is passed from the controller 25 to the relay 27 and over line 29 to the inlet controller 30 indicating that no change in water flow is required. If, however, the outlet gas temperature is above the set point, a signal is sent from the controller 25 to relay 27 and over line 29 to the controller 30 changing the set point value of the controller 30. Thus, the controller 30 causes the water valve 36 to open and increase the flow of water to the tower to effect more cooling and lower the outlet gas temperature. The action of the controller 25 will thus be recognized as proportional mode of control.

In a cascade system, proportional control is coupled with derivative or rate mode of control. Rate control senses any rapid change in the inlet temperature of the gas. Therefore, in the event the inlet gas temperature begins to increase at a rapid rate, the temperature sensed by the thermocouple 31 causes the inlet temperature controller 30 to be activated by rate action and immediately cause more water to be delivered to the tower. The rate mode of control, therefore, greatly dampens temperature fluctuations or "spikes" in order to maintain a constant outlet temperature.

The foregoing type of cascade control is designed to cool a tower with a fluctuating inlet temperature to a lower outlet temperature. Depending upon the process conditions, however, a sharp temperature change may occur while the inlet temperature is still below the desired outlet temperature. This may typically occur during start-up of the unit. If the rate action control is allowed to take over, the valve 36 would be opened by the controller 30 and an undesirable and possibly damaging excess of water would be delivered to the gas stream. Likewise, a rapid decrease in temperature change would cause the controller 30 to over react and deliver too little water to the tower. In order to prevent such occurrences, the rate action control of controller 30 is eliminated by means of the relay switch 27 until the inlet gas temperature reaches a predetermined value where cooling with cascade control is feasible. When the inlet gas temperature is below a preset temperature, the alarm contacts in the inlet controller 30 remain closed, which energizes the relay 27 through line 37 and causes signals from the outlet temperature controller 25 through line 26 to be transmitted through line 28, instead of line 29, thereby allowing the proportional action of the controller 25 to directly control the flow valve 36. When the inlet gas temperature reaches the preselected value, the alarm contacts open, thus de-energizing the relay 27 and allowing signals from the controller 25 received through line 26 to be transmitted over line 29 to the controller 30 in order to adjust the set point of the controller 30 and effect cascade type control.

Since the temperatures of the process gases will normally be near the design conditions, the relay 27 is selected so that a failure of the relay will automatically place the system in cascade control. This is achieved by requiring an electrical signal to energize the relay coil before the system transfers direct water valve control to the outlet controller 25.

By way of example, it may be assumed that the evaporative cooler is employed to cool the hot gases from a cupola in a foundry, and that the outlet temperature of the cooler will be approximately 400° F. Consequently, the set point for the outlet temperature controller 25 would correspond to 400° F. During steady state operation, the inlet gas to the tower may typically run 800° F. with fluctuations or spikes up to 1800+° F. During start-up of the unit, when the inlet gas temperature increases from ambient, it is desirable that the rate control signals be blocked at least until the inlet gas temperature rises above the set point temperature of the outlet controller 25. In practice, however, such rate signals are blocked until substantially steady state conditions are reached which, in the example given, would be approximately 800° F. During this start-up time, the water flow is regulated by proportional control which, as previously mentioned, is only responsive to the temperature fluctuations of the outlet gas sensed by thermocouple 21. Above the predetermined value for the inlet gas temperature, however, the rate control signals of controller 30 are no longer blocked and the tower is transferred to cascade type control where both the derivative mode generated by rate changes of the inlet gas and the proportional mode generated by the temperature of the outlet gas are employed to modulate the water flow.

Figure 4:
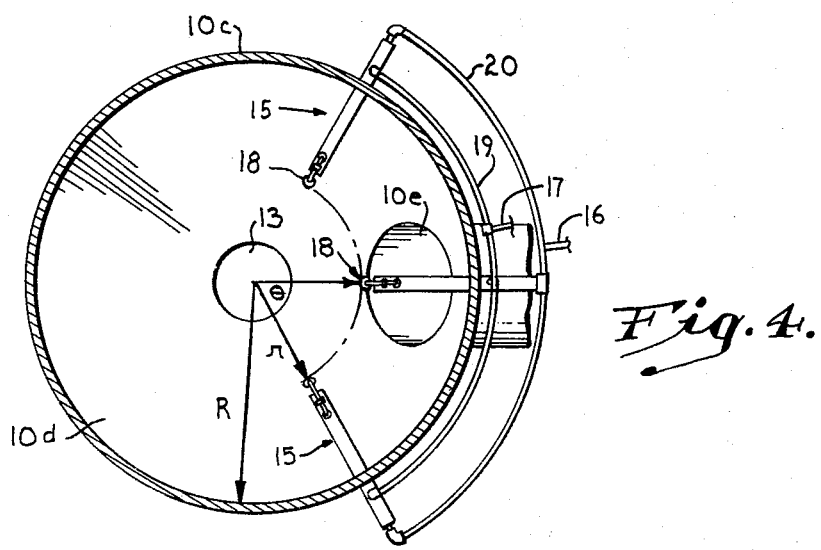
FIG. 4 is an enlarged plan view above the spray header assemblies, taken along line 4—4 of FIG. 1 in the direction of the arrows.

At this point, it will be evident that the features of our evaporative cooler are primarily directed to a design for totally dry bottom operation. In carrying out this general intent, it should be noted that the gas discharge from the tower is located in the lower hopper section rather than the cylindrical shell of the tower body. Such location not only provides additional effective tower height in which water may be vaporized by the process gas, but also permits the gas to sweep through the hopper section and maintain entrainment of particulate matter which is carried by the process gas to subsequent pollution control equipment. Such arrangement further provides, as opposed to a location on the cylindrical shell, a larger discharge mouth and, as shown in FIG. 4, presents a more effective transition of the gas from downward vertical flow to a horizontal flow direction.

Dry bottom operations are also enhanced by locating the spray nozzle in the preferred orientation as taught herein. In this manner, the possibility of impingement is eliminated since the spray pattern is precluded from contacting the tower walls and since there is no overlap of patterns generated by successive nozzles.

Likewise, the control system plays an important role in maintaining a dry discharge gas, since excessive water fed to the tower is most undesirable. With cascade type control, unusual temperature fluctuations in the inlet gas which would normally cause larger quantities of water to be delivered to the tower are dampened by means of rate control. During start-up operations, excessive water flow is prevented since the rate control signals are blocked until the inlet temperature reaches a preselected value above the set point of the outlet gas.

From the foregoing, it will be seen that this invention is one well adapted to obtain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. An evaporative cooler for cooling hot process gas by the vaporization of liquid water, said cooler comprising:
a vertical vessel having a radius R;
an inlet gas conduit connected to the top of said vessel for delivering hot process gas thereto;
an outlet gas duct connected to the bottom of said vessel for discharging process gas therefrom;
liquid spray means disposed in the upper region of said vessel for spraying liquid water into the vessel, said means including a nozzle emitting a cone-shape spray pattern characterized by an included cone angle $\Phi$, said nozzle located from the center of said vessel no greater than the distance $r$ defined by the expression:
$r = R - 2 \tan(\Phi/2)$
whereby contact of the spray pattern with the vessel is prevented in order to minimize condensation of the water.

2. The cooler as in claim 1, said spray means including a plurality of nozzles, each said nozzle emitting a cone-shaped spray pattern characterized by an included cone angle $\Phi$ and each said nozzle located from the center of said vessel no greater than the distance $r$ defined by the expression:
$r = R - 2 \tan(\Phi/2)$
said nozzles being located in a single horizontal plane perpendicular to the axis of the vessel and adjacent nozzles being separated by an angle $\theta$ measured about the center of the vessel and defined by the expression:

$$\theta = 2 \sin^{-1} \left[ \frac{2 \tan(\Phi/2)}{r} \right]$$

whereby contact of said spray pattern with the vessel and overlap of adjacent spray patterns is eliminated in order to minimize condensation of the water.

3. The cooler as in claim 1, and spray means including a plurality of nozzles, each said nozzle emitting a cone-shaped spray pattern characterized by an included cone angle $\Phi$ and each said nozzle located from the center of said vessel a distance $r$ defined by the expression:
$r = R - 2 \tan(\Phi/2)$
said nozzles being located in a single horizontal plane perpendicular to the axis of the vessel and adjacent nozzles being separated by an angle $\theta$ measured about the center of the vessel and defined by the expression:

$$\theta = 2 \sin^{-1} \left[ \frac{2 \tan(\Phi/2)}{R - 2 \tan(\Phi/2)} \right]$$

whereby contact of said spray pattern with the vessel and overlap of adjacent spray patterns is eliminated in order to minimize condensation of the water.

* * * * *